US012651069B2

(12) United States Patent     (10) Patent No.:   US 12,651,069 B2

Bhatia et al.     (45) Date of Patent:    Jun. 9, 2026

(54) BIOS VERIFICATION AS PART OF HROT IN BMC FIRMWARE IN A SECURED SERVER SYSTEM

(71) Applicant: American Megatrends International, LLC, Duluth, GA (US)

(72) Inventors: Anurag Bhatia, Sugar Hill, GA (US); Winston Thangapandian, Suwanee, GA (US); Valantina Arumugam, Chennai (IN); Sathiyaseelan Lakshminarayanan, Koradachery (IN)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 175 days.

(21) Appl. No.: 18/664,509

(22) Filed: May 15, 2024

(65) Prior Publication Data

US 2025/0356016 A1    Nov. 20, 2025

(51) Int. Cl.
| | |
|---|---|
| *G06F 9/44* | (2018.01) |
| *G06F 9/4401* | (2018.01) |
| *G06F 21/57* | (2013.01) |
| *H04L 9/30* | (2006.01) |

(52) U.S. Cl.
CPC .......... *G06F 21/572* (2013.01); *G06F 9/4403* (2013.01); *H04L 9/3073* (2013.01); *G06F 2221/034* (2013.01)

(58) Field of Classification Search
CPC .............. G06F 1/32; G06F 1/12; G06F 21/57
See application file for complete search history.

(56) References Cited

U.S. PATENT DOCUMENTS

| | | | |
|---|---|---|---|
| 2006/0020810 A1* | 1/2006 | Waltermann .......... | H04L 9/3236 713/179 |
| 2019/0042752 A1* | 2/2019 | Mihm .................. | G06F 21/575 |
| 2022/0137953 A1* | 5/2022 | Kawazu .................... | G06F 8/65 717/168 |
| 2024/0160749 A1* | 5/2024 | Koteshwara ............ | G06F 21/85 |

* cited by examiner

*Primary Examiner* — Keshab R Pandey

(74) *Attorney, Agent, or Firm* — Tim Tingkang Xia, Esq.; TROUTMAN PEPPER LOCKE LLP

(57) ABSTRACT

A BMC holds a host computer in a reset state by asserting a reset signal to the host computer. The BMC accesses at least a part of a BIOS image of the host computer from a storage device shared between the BMC and the host computer while the host computer is held in the reset state. The BIOS image is protected based on a private key of a public key/private key pair. The BMC validates at least the part of the BIOS image based on a public key of the public key/private key pair. The BMC releases the reset signal to enable the host computer to start a boot process upon successful validation of at least the part of the BIOS image.

13 Claims, 7 Drawing Sheets

200

206

600

602
verify BMC firmware by a Hardware Root of Trust (HROT) engine.

604
hold a host computer in a reset state

606
access a BIOS image of the host computer from a storage device shared between the BMC and the host computer

608
validate the BIOS image based on the public key of the public key / private key pair

610
release the host computer from the reset state

700

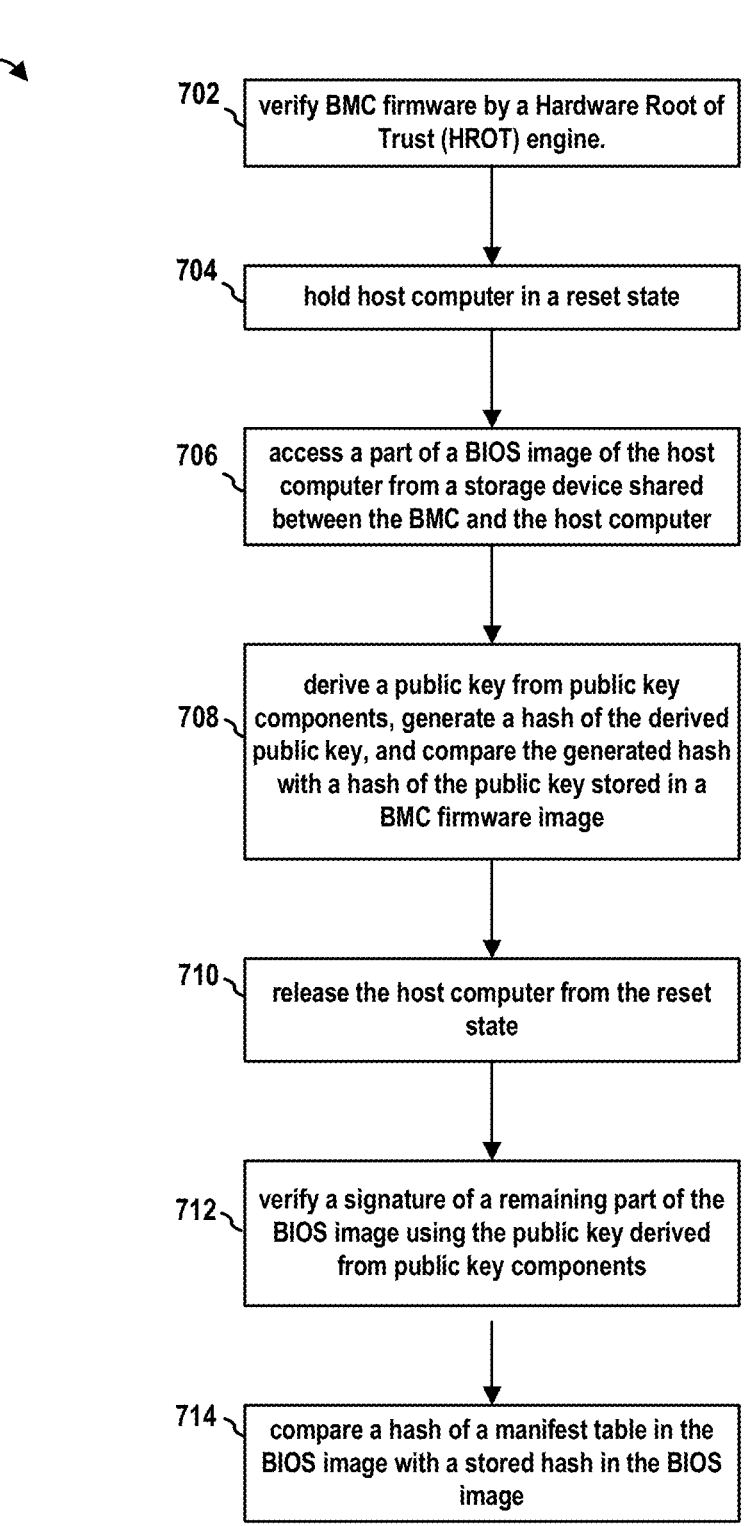

702  verify BMC firmware by a Hardware Root of Trust (HROT) engine.

704  hold host computer in a reset state 706  access a part of a BIOS image of the host computer from a storage device shared between the BMC and the host computer 708  derive a public key from public key components, generate a hash of the derived public key, and compare the generated hash with a hash of the public key stored in a BMC firmware image 710  release the host computer from the reset state 712  verify a signature of a remaining part of the BIOS image using the public key derived from public key components 714  compare a hash of a manifest table in the BIOS image with a stored hash in the BIOS image

FIG. 7

BIOS VERIFICATION AS PART OF HROT IN BMC FIRMWARE IN A SECURED SERVER SYSTEM

BACKGROUND

Field

The present disclosure relates generally to computer systems, and more particularly, to techniques of validating basic input/output system (BIOS) firmware image during a booting process of a host computer.

Background

The statements in this section merely provide background information related to the present disclosure and may not constitute prior art.

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, SNMP traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

The BMC may be considered as an embedded-system device or a service processor. A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus is a BMC. The BMC holds a host computer in a reset state by asserting a reset signal to the host computer. The BMC accesses at least a part of a BIOS image of the host computer from a storage device shared between the BMC and the host computer while the host computer is held in the reset state. The BIOS image is protected based on a private key of a public key/private key pair. The BMC validates at least the part of the BIOS image based on a public key of the public key/private key pair. The BMC releases the reset signal to enable the host computer to start a boot process upon successful validation of at least the part of the BIOS image.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 7 is a flow chart of a second method for validating a BIOS image of a host computer.

DETAILED DESCRIPTION

Figure 1:
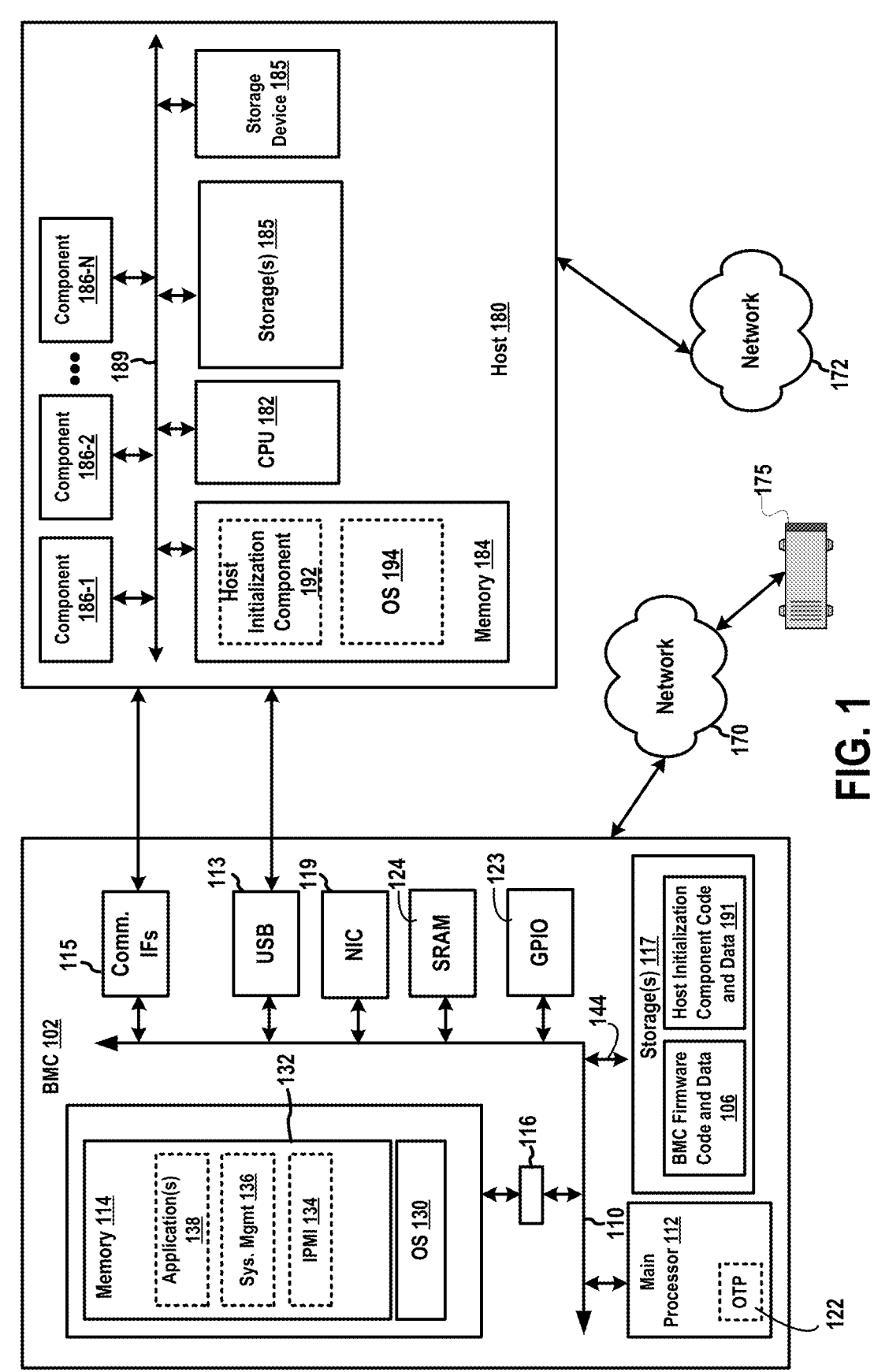
FIG. 1 is a diagram illustrating a computer system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as elements). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a processing system that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating a computer system 100. In this example, the computer system includes, among other devices, a baseboard management controller (BMC) 102 and a host computer 180. The BMC 102 has, among other components, a main processor 112, a memory 114 (e.g., a dynamic random access memory (DRAM)), a memory driver 116, storage(s) 117, a network interface card 119, a USB interface 113 (i.e., Universal Serial Bus), other communication interfaces 115, a SRAM 124 (i.e., static RAM), and a GPIO interface 123 (i.e., general purpose input/output interface). Further, the main processing unit 112 contains an OTP memory 122 (i.e., one time programmable memory).

The communication interfaces 115 may include a keyboard controller style (KCS), a server management interface chip (SMIC), a block transfer (BT) interface, a system management bus system interface (SSIF), and/or other suitable communication interface(s). Further, as described infra, the BMC 102 supports IPMI and provides an IPMI interface between the BMC 102 and the host computer 180. The IPMI interface may be implemented over one or more of the USB interface 113, the network interface card 119, and the communication interfaces 115.

In certain configurations, one or more of the above components may be implemented as a system-on-a-chip (SoC). For examples, the main processor 112, the memory 114, the memory driver 116, the storage(s) 117, the network interface card 119, the USB interface 113, and/or the communication interfaces 115 may be on the same chip. In addition, the memory 114, the main processor 112, the memory driver 116, the storage(s) 117, the communication interfaces 115, and/or the network interface card 119 may be in communication with each other through a communication channel 110 such as a bus architecture.

The BMC 102 may store BMC firmware code and data 106 in the storage(s) 117. The storage(s) 117 may utilize one or more non-volatile, non-transitory storage media. During a boot-up, the main processor 112 loads the BMC firmware code and data 106 into the memory 114. In particular, the BMC firmware code and data 106 can provide in the memory 114 a BMC OS 130 (i.e., operating system) and service components 132. The service components 132 include, among other components, IPMI services 134, a system management component 136, and application(s) 138. Further, the service components 132 may be implemented as a service stack. As such, the BMC firmware code and data 106 can provide an embedded system to the BMC 102.

The BMC 102 may be in communication with the host computer 180 through the USB interface 113, the network interface card 119, the communication interfaces 115, and/or the IPMI interface, etc.

The host computer 180 includes a host CPU 182, a host memory 184, storage device(s) 185, and component devices 186-1 to 186-N. The component devices 186-1 to 186-N can be any suitable type of hardware components that are installed on the host computer 180, including additional CPUs, memories, and storage devices. As a further example, the component devices 186-1 to 186-N can also include Peripheral Component Interconnect Express (PCIe) devices, a redundant array of independent disks (RAID) controller, and/or a network controller.

Further, the storage(s) 117 may store host initialization component code and data 191 for the host computer 180. After the host computer 180 is powered on, the host CPU 182 loads the initialization component code and data 191 from the storage(s) 117 though the communication interfaces 115 and the communication channel 110. The host initialization component code and data 191 contains an initialization component 192. The host CPU 182 executes the initialization component 192. In one example, the initialization component 192 is a basic input/output system (BIOS). In another example, the initialization component 192 implements a Unified Extensible Firmware Interface (UEFI). UEFI is defined in, for example, "Unified Extensible Firmware Interface Specification Version 2.6, dated January 2016," which is expressly incorporated by reference herein in their entirety. As such, the initialization component 192 may include one or more UEFI boot services.

The initialization component 192, among other things, performs hardware initialization during the booting process (power-on startup). For example, when the initialization component 192 is a BIOS, the initialization component 192 can perform a Power On System Test, or Power On Self Test, (POST). The POST is used to initialize the standard system components, such as system timers, system DMA (Direct Memory Access) controllers, system memory controllers, system I/O devices and video hardware (which are part of the component devices 186-1 to 186-N). As part of its initialization routine, the POST sets the default values for a table of interrupt vectors. These default values point to standard interrupt handlers in the memory 114 or a ROM. The POST also performs a reliability test to check that the system hardware, such as the memory and system timers, is functioning correctly. After system initialization and diagnostics, the POST surveys the system for firmware located on non-volatile memory on optional hardware cards (adapters) in the system. This is performed by scanning a specific address space for memory having a given signature. If the signature is found, the initialization component 192 then initializes the device on which it is located. When the initialization component 192 includes UEFI boot services, the initialization component 192 may also perform procedures similar to POST.

After the hardware initialization is performed, the initialization component 192 can read a bootstrap loader from a predetermined location from a boot device of the storage device(s) 185, usually a hard disk of the storage device(s) 185, into the host memory 184, and passes control to the bootstrap loader. The bootstrap loader then loads an OS 194 into the host memory 184. If the OS 194 is properly loaded into memory, the bootstrap loader passes control to it. Subsequently, the OS 194 initializes and operates. Further, on certain disk-less, or media-less, workstations, the adapter firmware located on a network interface card re-routes the pointers used to bootstrap the operating system to download the operating system from an attached network.

The service components 132 of the BMC 102 may manage the host computer 180 and is responsible for managing and monitoring the server vitals such as temperature and voltage levels. The service stack can also facilitate administrators to remotely access and manage the host computer 180. In particular, the BMC 102, via the IPMI services 134, may manage the host computer 180 in accordance with IPMI. The service components 132 may receive and send IPMI messages to the host computer 180 through the IPMI interface.

Further, the host computer 180 may be connected to a data network 172. In one example, the host computer 180 may be a computer system in a data center. Through the data network 172, the host computer 180 may exchange data with other computer systems in the data center or exchange data with machines on the Internet.

The BMC 102 may be in communication with a communication network 170 (e.g., a local area network (LAN)). In this example, the BMC 102 may be in communication with the communication network 170 through the network interface card 119. Further, the communication network 170 may be isolated from the data network 172 and may be out-of-band to the data network 172 and out-of-band to the host computer 180. In particular, communications of the BMC 102 through the communication network 170 do not pass through the OS 194 of the host computer 180. In certain configurations, the communication network 170 may not be connected to the Internet. In certain configurations, the communication network 170 may be in communication with the data network 172 and/or the Internet. In addition, through the communication network 170, a remote device 175 may communicate with the BMC 102. For example, the remote device 175 may send IPMI messages to the BMC 102 over the communication network 170.

Further, the storage(s) 117 is in communication with the communication channel 110 through a communication link 144.

Figure 2:
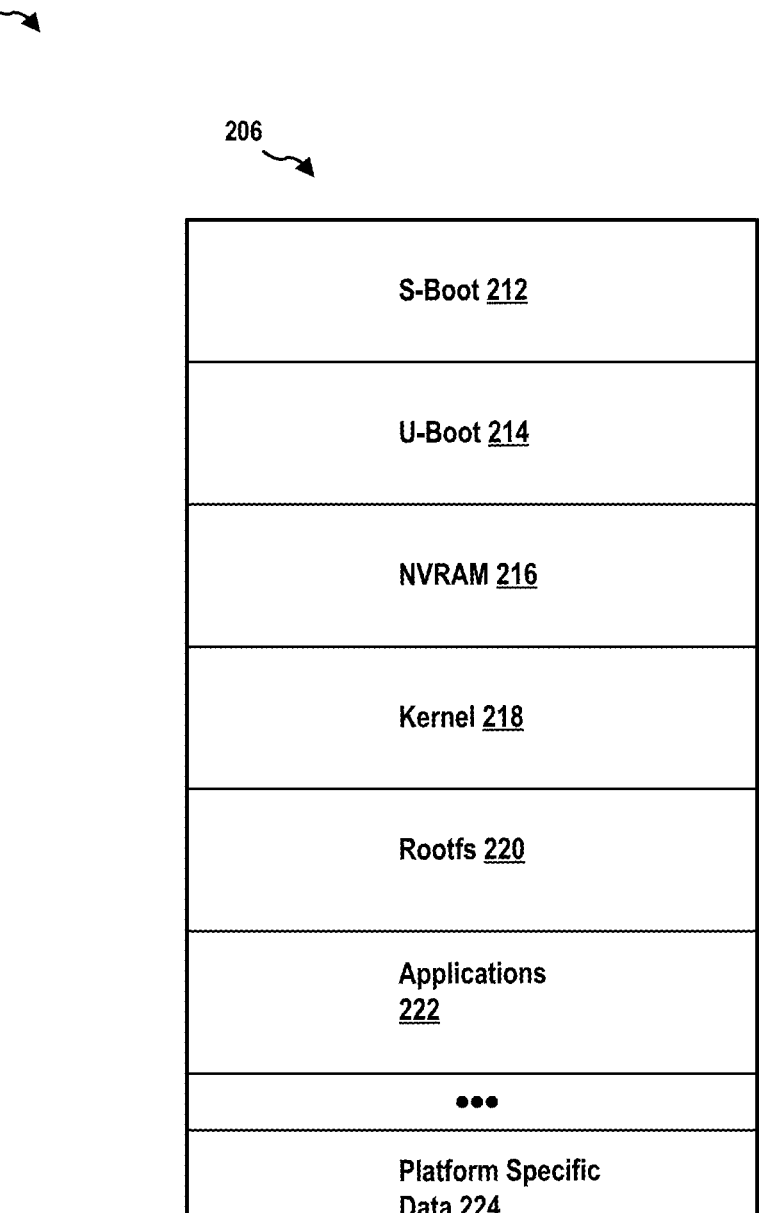
FIG. 2 is a diagram illustrating a BMC firmware image.

FIG. 2 is a diagram 200 illustrating a BMC firmware image 206, which is an exemplary image containing the BMC firmware code and data 106. The BMC firmware image 206 contains data sections of an S-Boot 212 (i.e., a first boot program), a U-Boot 214 (i.e., a second boot program), a NVRAM 216 (i.e., non-volatile random-access memory), a kernel 218, a rootfs 220 (i.e., root file system), applications 222, and platform specific data 224.

Figure 3:
FIG. 3 is a diagram illustrating validation procedures utilized in a bootup process of the BMC.
Figure 3:
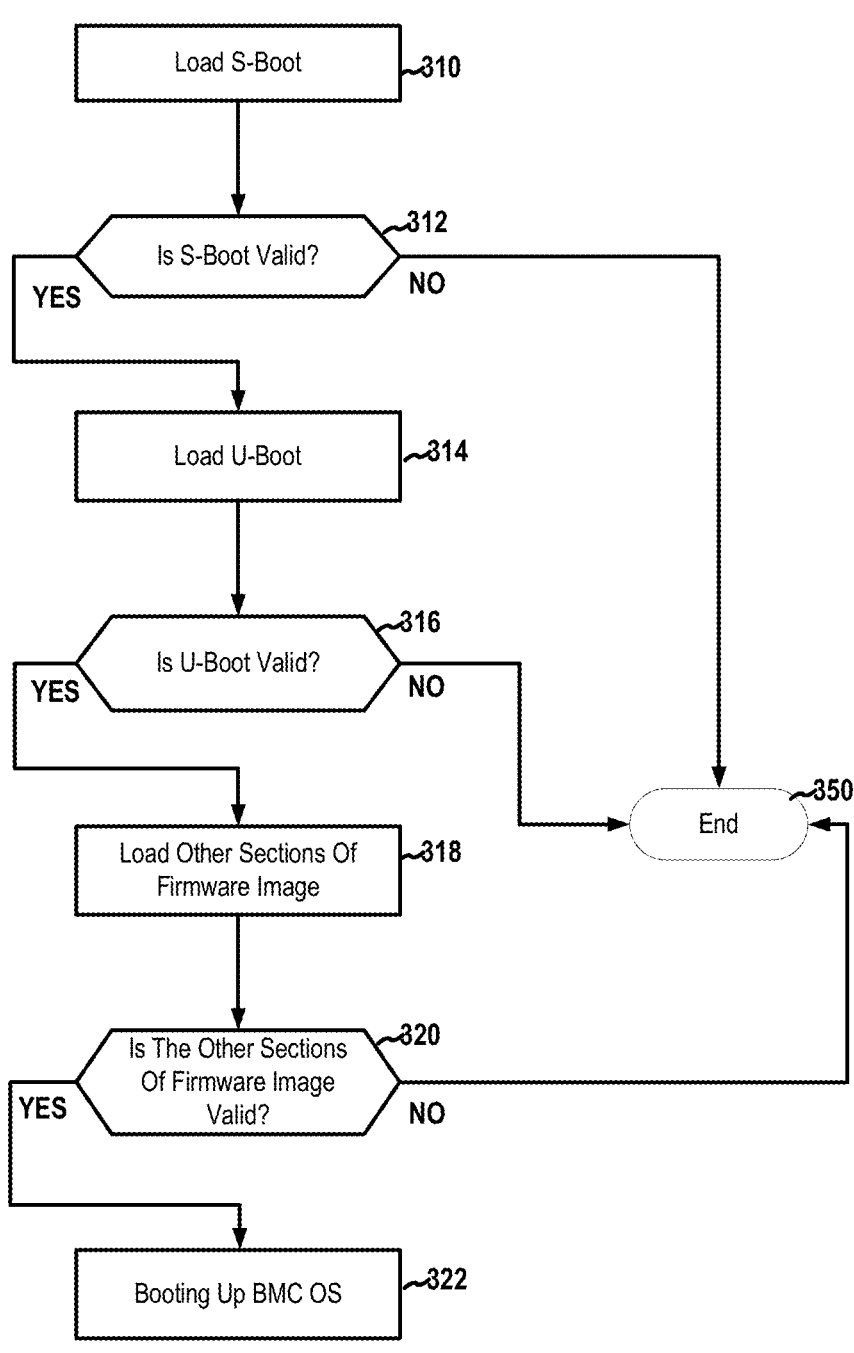

FIG. 3 is a diagram 300 illustrating validation procedures utilized in a bootup process of the BMC 102. After the BMC 102 is powered on or reset, the BMC 102 enters a booting process. In procedure 310, the processing unit 112 loads, from the storage 117, the data section of the BMC firmware image 206 containing the S-Boot 212 (e.g., the initial 64 KB) into the SRAM 124. The data of this section are encrypted with the private key A of a first public key/private key pair.

In procedure 312, the processing unit 112 validates the data section of the S-Boot 212. In particular, the OTP memory 122 of the processing unit 112 is programmed with the public key A of the first public key/private key pair. The processing unit 112 retrieves the public key A from the OTP memory 122, and uses the public key A to decrypt the data section of the S-Boot 212. As such, the decrypted data of the S-Boot 212 are stored in the SRAM 124. Further, in certain configurations, the processing unit 112 may calculate a hash for the decrypted data of the S-Boot 212 and extract another hash stored in the decrypted data. The processing unit 112 then compares the calculated hash and the stored hash to determine if the S-Boot 212 is valid.

When the data section containing the S-Boot 212 is not valid, the processing unit 112 enters procedure 350, in which the booting process is ended. When data of the S-Boot 212 is valid, the processing unit 112 executes the S-Boot 212. The S-Boot 212 initializes the memory 114 (e.g., a DRAM). Subsequently, in procedure 314, the S-Boot 212 loads the data section of the BMC firmware image 206 containing the U-Boot 214 into the memory 114. In procedure 316, the S-Boot 212 then validates the data of the U-Boot 214. For example, similar to what was described supra, the processing unit 112 may use hashes to validate the data section containing the U-Boot 214.

When the data section containing the U-Boot 214 is not valid, the S-Boot 212 enters procedure 350, in which the booting process is ended. When data section containing the U-Boot 214 is valid, the S-Boot 212 passes control to the U-Boot 214. That is, the processing unit 112 executes the U-Boot 214 and enters procedure 318.

In procedure 318, the U-Boot 214 then loads the remainder of the BMC firmware image 206 (e.g., data sections of the NVRAM 216, the kernel 218, the rootfs 220, the applications 222, the platform specific data 224, etc.) into the memory 114. In certain configurations, the data sections of the kernel 218, the rootfs 220, the applications 222, and/or other components are encrypted by the private key B of a second public key/private key pair. Further, the platform specific data 224 contain the public key B of the second public key/private key pair.

In procedure 320, the U-Boot 214 validates those data sections of the BMC firmware image 206. In particular, the U-Boot 214 retrieves the public key B from the platform specific data 224 and uses the public key B to decrypt the data sections containing the kernel 218, the rootfs 220, the applications 222, etc. Further, similar to what was described supra, the processing unit 112 may use hashes to validate the data containing those components.

When the data sections of the kernel 218, the rootfs 220, the applications 222, and/or other components are not valid, the U-Boot 214 enters procedure 350, in which the booting process is ended. When those sections are valid, in procedure 322, the BMC OS 130 is booted up. In particular, the U-Boot 214 passes the control to the kernel 218. The kernel 218 then initializes the rootfs 220. The kernel 218 then mounts the NVRAM 216 (e.g., utilizing the SRAM 124). The NVRAM 216 may contain system configuration information, such as settings for the hardware and the BMC firmware. The applications 222 (e.g., the IPMI services 134, the system management component 136, and the application(s) 138) are then started.

Figure 4:
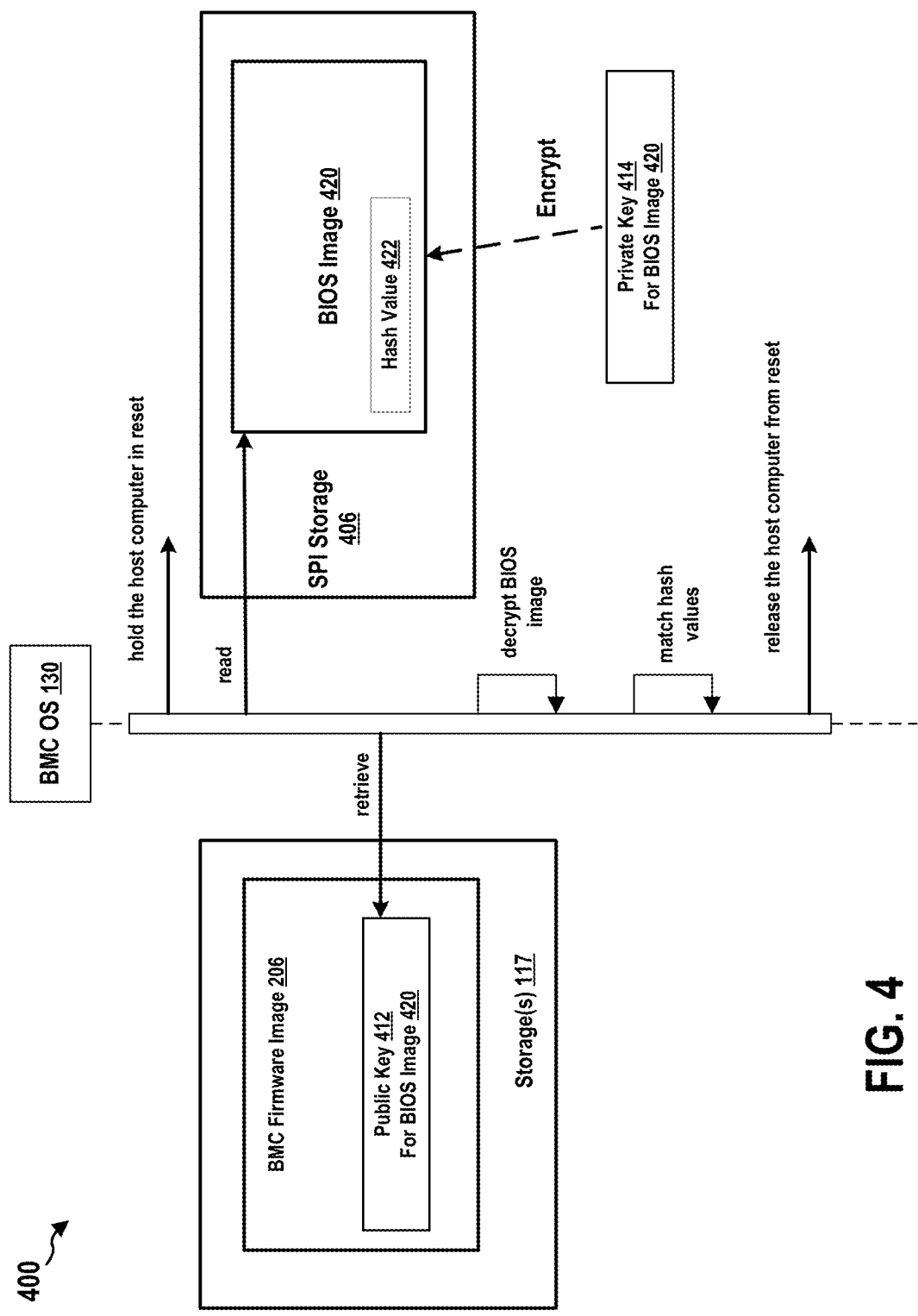
FIG. 4 is a diagram illustrating a first technique of validating the host initialization component code and data.

FIG. 4 is a diagram 400 illustrating a first technique of validating the host initialization component code and data 191. A BIOS image 420 is an exemplary image of the initialization component code and data 191. The BIOS image 420 is stored in a SPI storage 406, which is a part of the storage(s) 117.

In the computer system 100, the BMC 102 acts as a firmware trust verifier for the BIOS firmware of the host computer 180. The host computer 180 is only allowed to boot upon successful validation of the BIOS firmware by the BMC 102. This provides secure booting of the host computer 180.

The BMC 102 is granted shared permission to access the SPI storage 406, which stores the BIOS image 420 containing the BIOS firmware. This allows the BMC 102 to read the BIOS firmware for validation.

As described supra, the BMC firmware itself, stored in the BMC firmware image 206, is first verified by the HROT (Hardware Root of Trust) engine before the BMC 102 proceeds to validate the BIOS firmware. This establishes a chain of trust; the BMC 102 is a trusted entity for verifying the BIOS firmware.

In the first technique, the BMC OS 130 holds the host computer 180 in reset while it verifies the full BIOS image 420 stored in the SPI storage 406. More specifically, the BMC OS 130 operates the BMC 102 to assert a reset signal to the host computer 180, preventing it from starting its boot process. This reset state is maintained until the BMC 102 has completed its verification of the BIOS image 420. As such, the host computer 180 cannot execute potentially compromised or unauthorized BIOS code.

The BMC 102 is granted shared access to the SPI storage 406, allowing it to read the contents of the BIOS image 420. The BIOS image 420 is encrypted using a private key 414 of a public key/private key pair specific to the BIOS image 420. The corresponding public key 412 is stored within the BMC firmware image 206.

To verify the integrity of the BIOS image 420, the BMC OS 130 retrieves the public key 412 from the BMC firmware image 206 and uses it to decrypt the BIOS image 420. The decrypted data of the BIOS image 420 is then stored in the SRAM 124.

Additionally, the BMC OS 130 may calculate a hash value for the decrypted data of the BIOS image 420 and compare it with a hash value 422 stored within the BIOS image 420 itself. If the calculated hash matches the stored hash, the BIOS image 420 is considered valid.

As such, the BMC 102 reads and authenticates the entire contents of the BIOS image 420 in the SPI storage 406 before allowing the host computer 180 to boot. Once the BIOS image 420 is successfully authenticated, the BMC 102 releases the reset line, allowing the host computer 180 to reboot and continue its normal boot process.

Figure 5:
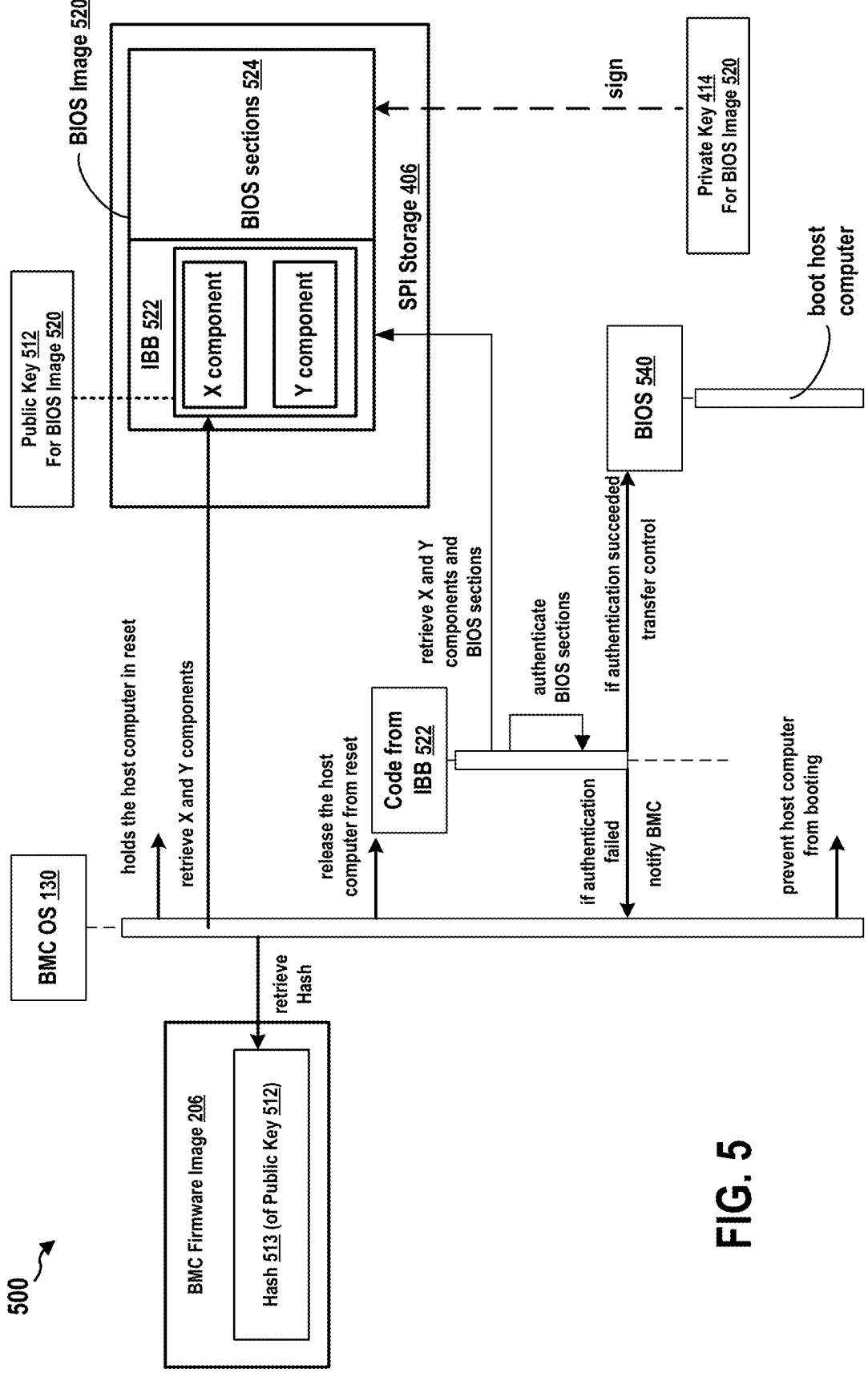
FIG. 5 is a diagram illustrating a second technique of validating the host initialization component code and data.

FIG. 5 is a diagram 500 illustrating a second technique of validating the host initialization component code and data 191. A BIOS image 520 is an exemplary image of the initialization component code and data 191. The BIOS image 520 is stored in a SPI storage 406, which is a part of the storage(s) 117. A BIOS 540 contained in the BIOS image 520 is to be executed by the host CPU 182 during a booting process of the host computer 180.

The BIOS image 520 contains an Initial Boot Block (IBB) 522, which is the first section of the BIOS firmware, and remaining BIOS sections 524. The BIOS image 520 holds, e.g., in a manifest data section of the IBB 522, X and Y components of a public key 512, which is part of a public key/private key pair specific to the BIOS image 520. The X and Y component are the compressed form of Elliptic curve (EC) secp384r1 or prime256v1 based public key, representing coordinates on an elliptic curve. The corresponding private key 514 is used to sign the BIOS image 520.

In the second technique, the BMC OS 130 validates only the IBB 522 of the BIOS image 520, and then allows the code from the IBB 522 to validate the remaining BIOS sections 524. In certain configurations, the BIOS image 520 is signed using the ECDSA (Elliptic Curve Digital Signature Algorithm) with the private key 514. The BMC firmware image 206 stores a hash 513 of the public key 512.

During the process of singing the BIOS image 520, the ECDSA signature generation process is applied to each BIOS section 524. A cryptographic hash function (e.g., SHA-256) is applied to each BIOS sections 524 to generate a unique digest representing the data. This digest protects data integrity and detects any modifications. The private key 514 is used to sign the hash of the BIOS sections 524 using the ECDSA algorithm. The signing process involves complex mathematical operations on the elliptic curve and results in a signature consisting of two values, $\{r,s\}$. The generated ECDSA signature $\{r,s\}$ is stored within the BIOS image 520 itself, typically within a dedicated signature section or appended to the BIOS sections.

To verify the integrity of the BIOS image 520, the BMC OS 130 first validates the IBB 522. It fetches the X and Y components of the public key 512 from the BIOS image 520 and derives the public key. It then generates a hash of this derived public key and compares it with the hash 513 of the public key stored in the BMC firmware image 206. If the hashes match, the IBB 522 is considered valid.

The IBB 522 is the first section of the BIOS image 520. The IBB 522 contains the initial code and data required to start the execution of the BIOS 540. Once the IBB 522 is authenticated, the BMC 102 releases the reset line, allowing the host computer 180 to start its boot process.

When the host computer 180 starts the boot process, the host CPU 182 begins executing the code from the IBB 522. The IBB 522 performs the necessary hardware initializations and sets up the environment for the BIOS execution.

After the code from the IBB 522 has completed its tasks, it may load the BIOS sections 524 into memory for authentication. If a BIOS section 524 is compressed, the code from the IBB 522 decompresses it using the decompression routines.

More specifically, the code from the IBB 522 retrieves the public key components $\{X,Y\}$ from the manifest data section, calculates a hash value of a given BIOS sections 524, and input them with the corresponding signature $\{r,s\}$ to the ECDSA signature verification algorithm. The output is a boolean value indicating whether the signature is valid or invalid. This algorithm performs mathematical operations on the elliptic curve to confirm that the signature was indeed generated using the corresponding private key and that the data has not been altered.

In addition to validating the ECDSA signature of the BIOS sections 524, the code from the IBB 522 may also verify the integrity of the manifest table within the BIOS image 520. The manifest table contains metadata and hashes of various components of the BIOS image 520 (e.g., the BIOS sections 524). To achieve a Chain of Root of Trust (CROT) for the BIOS firmware, the code from the IBB 522 calculates the hash of the manifest table and compares it to a hash value stored in another section of the BIOS image 520. This additional verification step determines whether the manifest table itself has been tampered with or modified.

By verifying the manifest table hash, the code from the IBB 522 establishes a trusted chain of integrity checks. It confirms that the metadata and hashes stored in the manifest table are genuine and have not been altered. This verification complements the ECDSA signature validation of the BIOS sections 524, providing an extra layer of security.

If the calculated hash of the manifest table matches the stored hash value, it indicates that the manifest table is authentic and can be trusted. This reinforces the Chain of Root of Trust, as the manifest table serves as a reliable reference for verifying other components of the BIOS image 520.

However, if the manifest table hash verification fails, it suggests that the manifest table has been compromised. In such cases, the code from the IBB 522 treats it as a security breach and notifies the BMC 102. The BMC 102 then takes appropriate actions, such as preventing the host computer 180 from booting, to maintain the integrity of the system.

If the code from the IBB 522 determines that the BIOS sections 524 are valid, it proceeds with the boot process. The code from the IBB 522 locates and loads the main BIOS 540 from the BIOS sections 524 into the memory 184 of the host computer 180. After the BIOS 540 is loaded into the memory 184, the code from the IBB 522 transfers control to it. This marks the beginning of the main BIOS 540 initialization and boot process. The BIOS 540 takes over and performs further hardware initialization, device detection, and configuration. It also searches for bootable devices and loads the operating system or other boot loaders to continue the boot process.

However, if the validation fails, the code from the IBB 522 notifies the BMC 102, which then prevents the host computer 180 from booting to protect the integrity of the system.

Figure 6:
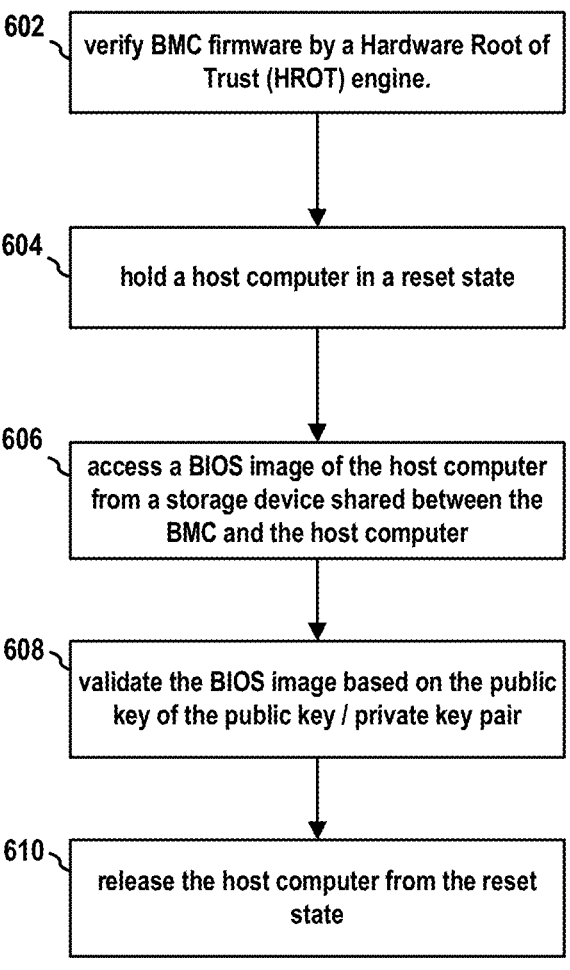
FIG. 6 is a flow chart of a first method for validating a BIOS image of a host computer.

FIG. 6 is a flow chart 600 of a first method (process) for validating a BIOS image of a host computer. The method may be performed by a BMC (e.g., the BMC 102). In operation 602, the BMC verifies BMC firmware by a Hardware Root of Trust (HROT) engine. In operation 604, the BMC holds a host computer (e.g., the host computer 180) in a reset state. This prevents the host computer from starting its boot process.

In operation 606, while the host computer is held in the reset state, the BMC accesses a BIOS image (e.g., the BIOS image 420) of the host computer from a storage device (e.g., the SPI storage 406) shared between the BMC and the host computer. The BIOS image is protected based on a private key (e.g., the private key 414) of a public key/private key pair specific to the BIOS image. In certain configurations, a public key (e.g., the public key 412) is stored in a BMC firmware image (e.g., the BMC firmware image 206) of the BMC.

In operation 608, the BMC validates the BIOS image based on the public key (e.g., the public key 412) of the public key/private key pair. The BMC decrypts the BIOS image using the public key and compares a first hash value calculated from the decrypted BIOS image with a second hash value stored in the BIOS image.

In operation 610, upon successful validation of the BIOS image, the BMC releases the host computer from the reset state. This enables the host computer to start its boot process.

FIG. 7 is a flow chart 700 of a second method (process) for validating a BIOS image of a host computer. The method may be performed by a BMC (e.g., the BMC 102). In operation 702, the BMC verifies BMC firmware by a Hardware Root of Trust (HROT) engine before validating at least a part of the BIOS image. In operation 704, the BMC holds a host computer (e.g., the host computer 180) in a reset state, for example, by asserting a reset signal to the host computer. This prevents the host computer from starting its boot process.

In operation 706, while the host computer is held in the reset state, the BMC accesses a part of a BIOS image (e.g., the BIOS image 520) of the host computer from a storage device (e.g., the SPI storage 406) shared between the BMC and the host computer. The BIOS image is protected based on a private key (e.g., the private key 514) of a public key/private key pair specific to the BIOS image. In certain configurations, the part of the BIOS image is an initial boot block (IBB) (e.g., the IBB 522) of the BIOS image.

In operation 708, the BMC validates the part of the BIOS image based on a public key (e.g., the public key 512) of the public key/private key pair. The BMC derives the public key from public key components stored in the IBB, generates a hash of the derived public key, and compares the generated hash with a hash of the public key stored in a BMC firmware image (e.g., the BMC firmware image 206) of the BMC.

In operation 710, upon successful validation of at least the part of the BIOS image, the BMC releases the reset signal to enable the host computer to start a boot process. As such, the BMC allows code from the IBB to validate a remaining part of the BIOS image (e.g., the BIOS sections 524) during the boot process of the host computer.

To validate the remaining part of the BIOS image, in operation 712, the code from the IBB verifies a signature of the remaining part of the BIOS image using the public key derived from public key components stored in the IBB. In certain configurations, the signature is an Elliptic Curve Digital Signature Algorithm (ECDSA) signature.

Additionally, to validate the remaining part of the BIOS image, in operation 714, the code from the IBB compares a hash of a manifest table in the BIOS image with a stored hash in the BIOS image. When the validation of the remaining part of the BIOS image fails, the BMC receives a notification of the validation failure and prevents the host computer from booting.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operation of a baseboard management controller (BMC), comprising:

holding a host computer in a reset state by asserting a reset signal to the host computer;

accessing an initial boot block (IBB) of a BIOS image of the host computer from a storage device shared between the BMC and the host computer while the host computer is held in the reset state, wherein the BIOS image is protected based on a private key of a public key/private key pair, wherein the IBB holds X and Y components of a public key of the public key/private key pair, the X and Y components being a compressed form of an elliptic curve (EC) based public key representing coordinates on an elliptic curve;

validating the IBB of the BIOS image based on the public key of the public key/private key pair, the validating comprising: deriving the public key from the X and Y components stored in the IBB, generating a hash of the derived public key, and comparing the generated hash with a hash of the public key stored in a BMC firmware image of the BMC; and releasing the reset signal to enable the host computer to start a boot process upon successful validation of the IBB of the BIOS image, wherein upon release of the reset signal, code from the IBB validates remaining BIOS sections of the BIOS image during the boot process of the host computer.

2. The method of claim 1, wherein the public key is stored in the BMC firmware image of the BMC.

3. The method of claim 1, wherein the validating the IBB of the BIOS image further comprises: verifying an ECDSA signature of the remaining BIOS sections using the public key derived from the X and Y components stored in the IBB; and comparing a hash of a manifest table in the BIOS image with a stored hash in the BIOS image.

4. The method of claim 1, wherein the BIOS image is stored in a Serial Peripheral Interface (SPI) storage device.

5. The method of claim 1, wherein the IBB is a first section of the BIOS image containing initial code and data required to start execution of a BIOS of the host computer.

6. The method of claim 1, wherein when the validation of the remaining BIOS sections fails, the method further comprises: receiving, at the BMC, a notification of the validation failure; and preventing the host computer from booting.

7. The method of claim 1, further comprising: verifying BMC firmware by a Hardware Root of Trust (HROT) engine before the validating the IBB of the BIOS image.

8. A baseboard management controller (BMC) comprising:

a processor; and a memory storing instructions that, when executed by the processor, cause the BMC to:

hold a host computer in a reset state by asserting a reset signal to the host computer;

access an initial boot block (IBB) of a BIOS image of the host computer from a storage device shared between the BMC and the host computer while the host computer is held in the reset state, wherein the BIOS image is protected based on a private key of a public key/private key pair, wherein the IBB holds X and Y components of a public key of the public key/private key pair, the X and Y components being a compressed form of an elliptic curve (EC) based public key representing coordinates on an elliptic curve;

validate the IBB of the BIOS image based on the public key of the public key/private key pair, the validation comprising: deriving the public key from the X and Y components stored in the IBB, generating a hash of the derived public key, and comparing the generated hash with a hash of the public key stored in a BMC firmware image of the BMC; and release the reset signal to enable the host computer to start a boot process upon successful validation of the IBB of the BIOS image, wherein upon release of the reset signal, code from the IBB validates remaining BIOS sections of the BIOS image during the boot process of the host computer.

9. The BMC of claim 8, wherein the public key is stored in the BMC firmware image of the BMC.

10. The BMC of claim 8, wherein the instructions to validate the IBB of the BIOS image further cause the BMC to: verify an ECDSA signature of the remaining BIOS sections using the public key derived from the X and Y components stored in the IBB; and compare a hash of a manifest table in the BIOS image with a stored hash in the BIOS image.

11. The BMC of claim 8, wherein the BIOS image is stored in a Serial Peripheral Interface (SPI) storage device.

12. The BMC of claim 8, wherein the IBB is a first section of the BIOS image containing initial code and data required to start execution of a BIOS of the host computer.

13. A non-transitory computer-readable medium storing instructions which when executed by a processor of a baseboard management controller (BMC) cause the BMC to:

hold a host computer in a reset state by asserting a reset signal to the host computer;

access an initial boot block (IBB) of a BIOS image of the host computer from a storage device shared between the BMC and the host computer while the host computer is held in the reset state, wherein the BIOS image is protected based on a private key of a public key/private key pair, wherein the IBB holds X and Y components of a public key of the public key/private key pair, the X and Y components being a compressed form of an elliptic curve (EC) based public key representing coordinates on an elliptic curve;

validate the IBB of the BIOS image based on the public key of the public key/private key pair, the validation comprising: deriving the public key from the X and Y components stored in the IBB, generating a hash of the derived public key, and comparing the generated hash with a hash of the public key stored in a BMC firmware image of the BMC; and release the reset signal to enable the host computer to start a boot process upon successful validation of the IBB of the BIOS image, wherein upon release of the reset signal, code from the IBB validates remaining BIOS sections of the BIOS image during the boot process of the host computer.

* * * * *